United States Patent
Liu

(10) Patent No.: US 10,645,450 B2
(45) Date of Patent: May 5, 2020

(54) SYSTEM AND METHOD FOR PROOF OF PLAY

(71) Applicant: Wistron Corporation, New Taipei (TW)

(72) Inventor: Wei-Lun Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/038,183

(22) Filed: Jul. 18, 2018

(65) Prior Publication Data

US 2019/0313152 A1    Oct. 10, 2019

(30) Foreign Application Priority Data

Apr. 9, 2018    (TW) .............................. 107112195 A

(51) Int. Cl.
*H04N 21/442*    (2011.01)
*F21V 8/00*    (2006.01)
(Continued)

(52) U.S. Cl.
CPC ....... *H04N 21/44204* (2013.01); *G02B 6/001* (2013.01); *G06F 21/554* (2013.01); *G06Q 30/0241* (2013.01); *H04N 21/23424* (2013.01); *G06Q 30/0248* (2013.01); *H04N 21/44008* (2013.01); *H04N 21/812* (2013.01)

(58) Field of Classification Search
CPC ....... H04N 21/44204; H04N 21/23424; G02B 6/001; G06Q 30/0241
See application file for complete search history.

(56) References Cited

U.S. PATENT DOCUMENTS 4,888,638 A * 12/1989 Bohn ................. H04N 21/4331
                                              725/34
6,411,725 B1 * 6/2002 Rhoads ................... G06F 21/10
                                              382/100
(Continued)

FOREIGN PATENT DOCUMENTS

CN    104283859    1/2015
JP    2012073312    4/2012
(Continued)

OTHER PUBLICATIONS

"Office Action of Taiwan Counterpart Application", dated Feb. 12, 2019, p. 1-p. 6.

(Continued)

*Primary Examiner* — Pankaj Kumar
*Assistant Examiner* — Alexander Boyd
(74) *Attorney, Agent, or Firm* — JCIPRNET

(57) ABSTRACT

A system and method for proof of play are provided. The system includes a video playing device that includes a display, a sensor, a transceiver and a processing unit. The display displays a video on a display surface, where the video displayed on the display surface has at least one frame. The sensor senses a displaying situation of the at least one frame on a specific location of the display surface as the display displays the video. The processing unit collects the displaying situation and controls the transceiver to send the displaying situation to a target device to determine whether the display has indeed displayed the video.

23 Claims, 16 Drawing Sheets

(51) Int. Cl.
*G06Q 30/02* (2012.01)
*H04N 21/234* (2011.01)
*G06F 21/55* (2013.01)
*H04N 21/44* (2011.01)
*H04N 21/81* (2011.01)

(56) References Cited

U.S. PATENT DOCUMENTS

| | | | |
|---|---|---|---|
| 7,712,114 B2* | 5/2010 | Ramaswamy | H04N 21/44204 725/14 |
| 8,213,801 B2 | 7/2012 | Nien et al. | |
| 8,650,588 B2* | 2/2014 | Mauduit | H04N 21/44204 725/22 |
| 2003/0014748 A1 | 1/2003 | Ben-David et al. | |
| 2003/0115591 A1 | 6/2003 | Weissmueller, Jr. et al. | |
| 2008/0120181 A1 | 5/2008 | Chang et al. | |
| 2009/0094642 A1* | 4/2009 | Hobson | H04N 21/44222 725/37 |
| 2010/0172651 A1 | 7/2010 | Nien et al. | |
| 2010/0231563 A1 | 9/2010 | Dunn et al. | |
| 2010/0238299 A1 | 9/2010 | Dunn et al. | |
| 2011/0096246 A1* | 4/2011 | Dunn | H04N 21/44008 348/739 |
| 2011/0123062 A1* | 5/2011 | Hilu | G06Q 30/02 382/100 |
| 2014/0152786 A1 | 6/2014 | Nicholson | |
| 2015/0228221 A1* | 8/2015 | Simon | G09G 3/006 345/83 |
| 2017/0164052 A1* | 6/2017 | Price | H04N 21/44218 |

FOREIGN PATENT DOCUMENTS

| | | |
|---|---|---|
| JP | 2012518211 | 8/2012 |
| TW | 200703139 | 1/2007 |
| TW | M315388 | 7/2007 |
| TW | I387226 | 2/2013 |
| TW | I569162 | 2/2017 |

OTHER PUBLICATIONS

Search Report of Europe Counterpart Application, dated Jan. 7, 2019, p. 1-p. 6.

"Office Action of Japan Counterpart Application," dated Sep. 24, 2019, p. 1-p. 4.

* cited by examiner

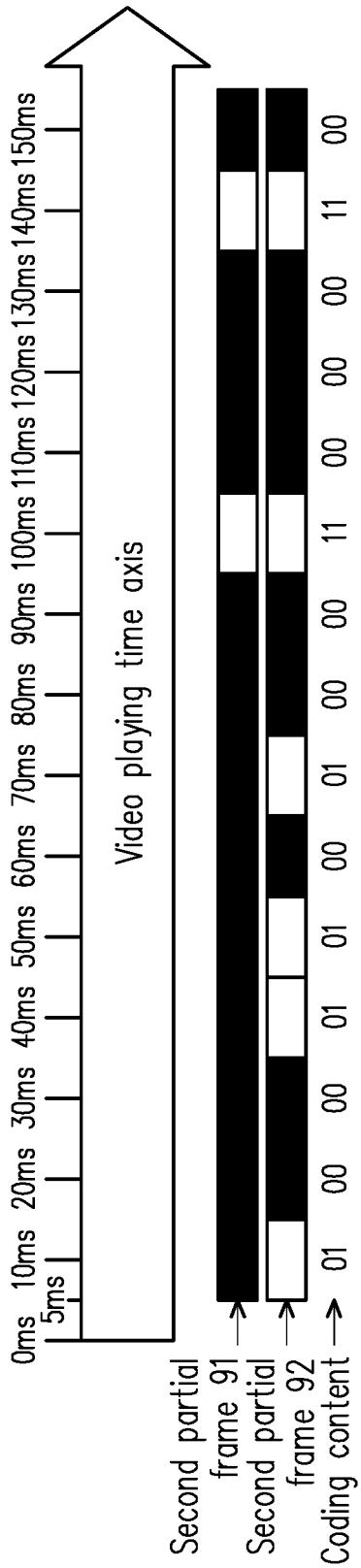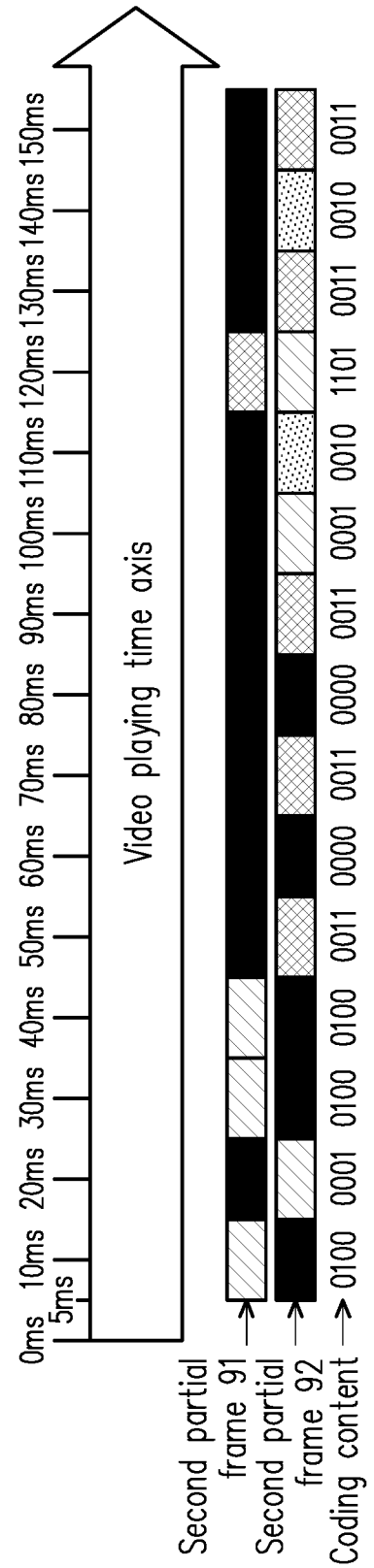
FIG. 9A
FIG. 9B

SYSTEM AND METHOD FOR PROOF OF PLAY

CROSS-REFERENCE TO RELATED APPLICATION

This application claims the priority benefit of Taiwan application serial no. 107112195, filed on Apr. 9, 2018. The entirety of the above-mentioned patent application is hereby incorporated by reference herein and made a part of this specification.

BACKGROUND OF THE INVENTION

Field of the Invention

The disclosure relates to a system and a method for video play, and particularly relates to a system and a method for proof of play adapted to confirm whether a required video has been normally played.

Description of Related Art

For an advertiser wishing to have an advertisement broadcasted on digital signage, how to confirm that the advertisement has been really played on the digital signage is essential, otherwise the advertiser may not be able to ensure that its advertisement achieves a desired advertising effect. Comparatively, how an advertising broadcaster owning the digital signage proves that the advertiser's advertisement has been indeed played on the digital signage so as to charge the advertiser is also an important issue.

The aforementioned problem of Proof of Play (POP) has always existed in the field of digital signage, and the current several solutions and their individual advantages and disadvantages are roughly as follows.

A conventional hardware solution is to monitor voltage and current conditions of various hardware parts of the digital signage, so as to prove that the digital signage has normally outputted the advertisement. However, such solution may only prove that the hardware operation of the digital signage is normal, but cannot directly prove that the advertisement is indeed broadcasted, and cannot get to learn the condition that the advertisement cannot be played because of damage of the display.

A conventional software solution is to use a complex software framework and a reliable playing mechanism to prove that the digital signage has normally outputted the advertisement. However, if a display of the digital signage is damaged, it is unable to learn that the advertisement has not been played.

A conventional hardware solution is to use a video camera to capture entire images of the display of the digital signage and send the images back for image analysis. However, such method requires a large amount of data processing, and requires manual verification.

Therefore, for a technician of the field, how to provide a low cost and high reliability POP problem solution is an important issue that needs to be solved.

SUMMARY OF THE INVENTION

The disclosure is directed to a system and a method for proof of play, which are adapted to solve the aforementioned POP problem, and have effects of low cost and high reliability.

The disclosure provides a video playing device including a display, a sensor, a transceiver, and a processing unit. The display displays a video on a display surface, where the video displayed on the display surface has at least one frame. The sensor senses a displaying situation of the at least one frame at a specific location of the display surface as the display displays the video. The processing unit is connected to the sensor, the display and the transceiver, and collects the displaying situation and controls the transceiver to send the displaying situation to a target device to determine whether the display has indeed displayed the video.

The disclosure provides a displaying situation capturing method, which is adapted to a video playing device including a display. The method includes: displaying a video on a display surface by the display, where the video displayed on the display surface has at least one frame; sensing a displaying situation of the at least one frame at a specific location of the display surface by a sensor as the display displays the video; and collecting the displaying situation by a processing unit and sending the displaying situation to a target device by using a transceiver to determine whether the display has indeed displayed the video.

The disclosure provides a displaying situation capturing module including a connection interface, a sensor, a transceiver and a processing unit. The connection interface is configured to connect a display. The sensor is configured to sense a displaying situation of a frame at a specific location of a display surface when the display surface of the display displays a video. The processing unit is connected to the sensor, the connection interface and the transceiver, and collects the displaying situation and controls the transceiver to send the displaying situation to a target device to determine whether the display has indeed displayed the video.

The disclosure provides a method for proof of play including: obtaining video representing information; converting the video representing information into a coding content; embedding the coding content to a video to produce a to-be-played video, where the to-be-played video includes a first partial frame and at least one second partial frame, the first partial frame corresponds to a plot content of the video, and the at least one second partial frame is obtained by converting the coding content; sending the to-be-played video to a display of a video playing device to display; receiving at least one displaying situation collected from at least one specific location on the display when the video playing device senses that the display displays the video, where the at least one specific location corresponds to the at least one second partial frame; and comparing the at least one displaying situation with the coding content to determine whether the video has been indeed played by the video playing device.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 9A is a schematic diagram of adjusting a frame of the video corresponding to the specific location according to the coding content.

FIG. 9B is another schematic diagram of adjusting a frame of the video corresponding to the specific location according to the coding content.

DESCRIPTION OF EMBODIMENTS

Figure 1:
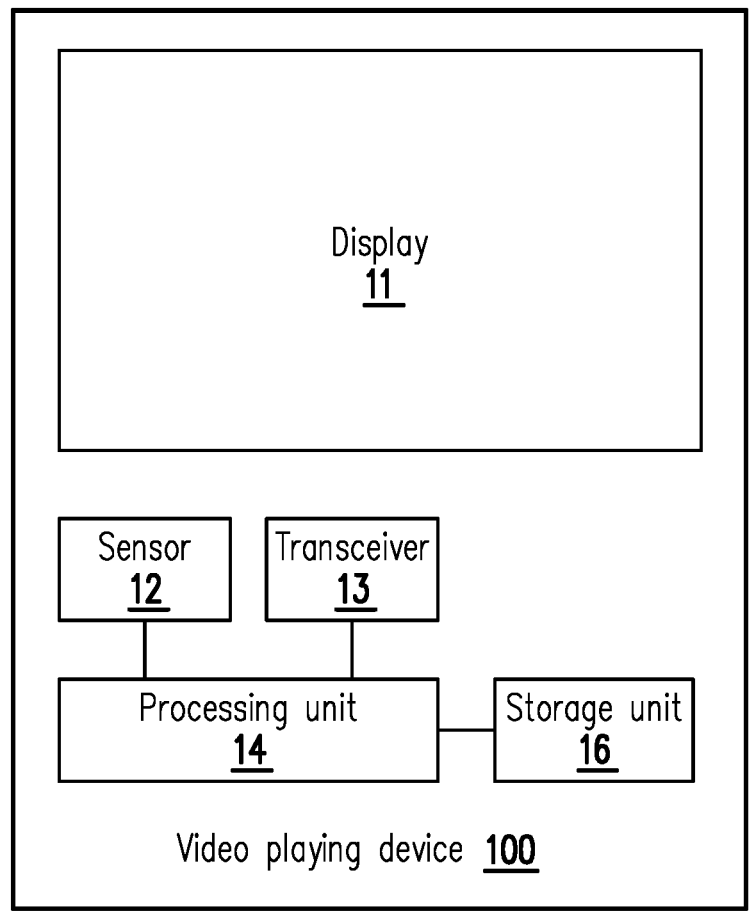
FIG. 1 is a block diagram of a video playing device according to an embodiment of the disclosure.

The disclosure provides a system for proof of play including a video playing device and a target device. Referring to FIG. 1, FIG. 1 is a block diagram of a video playing device according to an embodiment of the disclosure. In the embodiment, the video playing device 100 is, for example, a digital signage, which may be set on street, a building wall, or other location that is set by the practitioner of the video playing device 100 according to an actual requirement. Moreover, the practitioner of the video playing device 100 may be commissioned to play a specific video at a specific time, for example, an advertising video, a video of a movie and show, etc., though the disclosure is not limited thereto.

As shown in FIG. 1, the video playing device 100 includes a display 11, a sensor 12, a transceiver 13, a processing unit 14 and a storage unit 16. The display 11 is, for example, a Liquid-Crystal Display (LCD), a plasma display, a vacuum fluorescent display, a Light-Emitting Diode (LED) display, a Field Emission Display (FED), a projector and/or any other display capable of displaying information, or even other electronic devices having the aforementioned various display devices, which is not limited by the embodiment of the disclosure. Moreover, the display 11 may also be formed by combining a plurality of smaller displays or display panels, and the smaller displays or display panels may display a larger single frame cooperatively (i.e. a frame displayed by the display 11).

The sensor 12 is connected to the display 11, and may be or includes a photosensitive resistor, an image sensor or a single color photosensitive element, though the embodiment is not limited thereto, and as long as the element used for implementing the sensor 12 may sense an image variation or a brightness variation of the frame displayed by the display 11, it is considered to be within the scope of the disclosure. In the embodiment of the disclosure, through a light guide disposed at a specific location on or close to a display surface of the display 11, light emitted by the display 11 from the specific location is transmitted to the sensor 12. In various embodiments, the light guide may be a light guide fiber or a light guide plate, and a detailed implementation thereof is described later. In other embodiments, the sensor 12 may also be configured to directly face the specific location of the display surface of the display without using the light inlet by the aforementioned light guide fiber or light guide plate, which is determined according to an actual design requirement.

The transceiver 13 may be an assembly of a protocol unit, for example, a Global System for Mobile communication (GSM), a Personal Handy-phone System (PHS), a Code Division Multiple Access (CDMA) system, a Wireless Fidelity (Wi-Fi) system or a Worldwide interoperability for Microwave Access (WiMAX) system, etc., that is adapted to implement wireless signal transmission, but it does not exclude signal transmission using a wired network protocol.

The transceiver 13 may include or may be electrically coupled to one of a transmitter circuit, a receiver circuit, an Analog-to-Digital Converter (ACD), a Digital-to-Analog Converter (DAC), a Low noise Amplifier (LNA), a mixer, a filter, a matching circuit, a transmission line, a Power Amplifier (PA), one or a plurality of antenna units, a local storage medium, etc., or a combination thereof, though the disclosure is not limited thereto, and the transceiver 13 provides a wireless or wired accessing function to the video playing device 100 of FIG. 1. The receiver circuit may include functional units to implement operations such as low noise amplification, impedance matching, frequency mixing, frequency down conversion, filtering, amplification, etc. The transmitter circuit may include functional units to implement operations such as amplification, impedance matching, frequency mixing, frequency up conversion, filtering, power amplification, etc. The ADC or DAC is configured to convert an analog signal format to a digital signal format during an uplink signal processing period, and convert the digital signal format to the analog signal format during a downlink signal processing period.

The storage unit 16 is, for example, a Random Access Memory (RAM), a Read-Only Memory (ROM), a flash memory, a hard disk or any other element used for storing data, and the storage unit 16 may be used for recording a plurality of program codes, modules or other required files and information, though the disclosure is not limited thereto.

The processing unit 14 is connected to the sensor 12, the transceiver 13 and the storage unit 16, and may be or include a general purpose process, a special purpose processor, a conventional processor, a digital signal processor, a plurality of microprocessors, one or a plurality of microprocessors combined with a digital signal processor core, a controller, a micro controller, an Application Specific Integrated Circuit (ASIC), a Field Programmable Gate Array (FPGA), any other type of an integrated circuit, a state machine, a processor based on an Advanced RISC Machine (ARM) or a similar product. The processing unit 14 of the embodiment may further include an electronic element assisting the operation of the processor such as a ROM, a Real Time Clock (RTC), etc. besides the aforementioned processor.

Figure 2A:
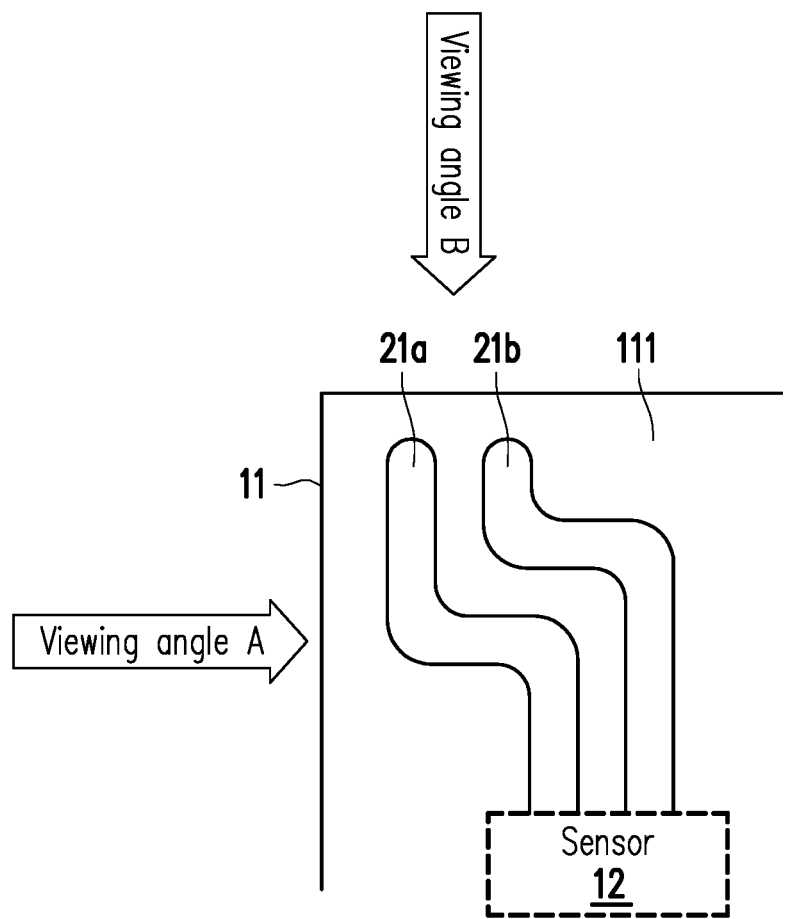
FIG. 2A is a top view of a display configured with a light guide according to an embodiment of the disclosure.
Figure 2B:
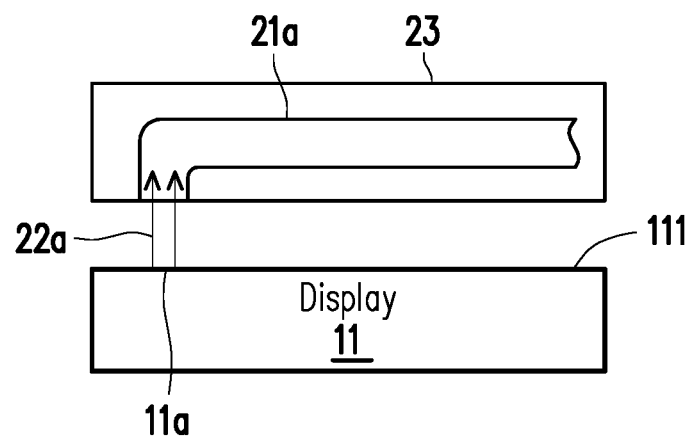
FIG. 2B is a side view of FIG. 2A viewing from a viewing angle A.
Figure 2C:
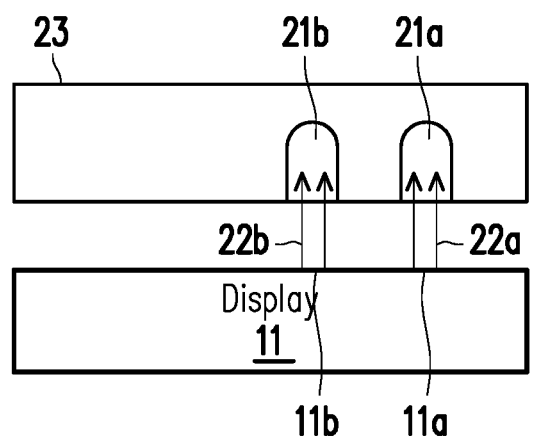
FIG. 2C is another side view of FIG. 2A viewing from a viewing angle B.

Referring to FIG. 2A, FIG. 2B and FIG. 2C, FIG. 2A is a top view of a display configured with a light guide according to an embodiment of the disclosure, FIG. 2B is a side view of FIG. 2A viewing from a viewing angle A, and FIG. 2C is another side view of FIG. 2A viewing from a viewing angle B.

As shown in FIG. 2A, FIG. 2B, FIG. 2C, by installing light guide fibers 21a and 21b on or close to specific locations 11a and 11b of a display surface 111 of the display 11, lights 22a and 22b emitted from the specific locations 11a and 11b of the display 11 may be transmitted to the sensor 12.

The specific location 11a may correspond to a certain pixel on the display 11, or pixels in a specific block of the display 11. Namely, the light 22a may be emitted by a single pixel, or emitted by all of the pixels in the above specific block. Similarly, the specific location 11b may correspond to a certain pixel on the display 11, or pixels in another specific block of the display 11. Namely, the light 22b may be emitted by a single pixel, or emitted by all of the pixels in the above another specific block.

Moreover, the light guide fibers 21a and 21b may be configured in an acrylic patch 23, or a transparent thin-film or flake made of other material, and the acrylic patch 23 may be attached to the display surface 111 of the display 11, such that one end of each of the light guide fibers 21a and 21b used for collecting the lights may be individually aligned with the specific locations 11a and 11b. Moreover, the light guide fibers 21a and 21b and the acrylic patch 23 are preferably transparent, so as to avoid influencing others from viewing the frames displayed by the display 11.

Figure 3A:
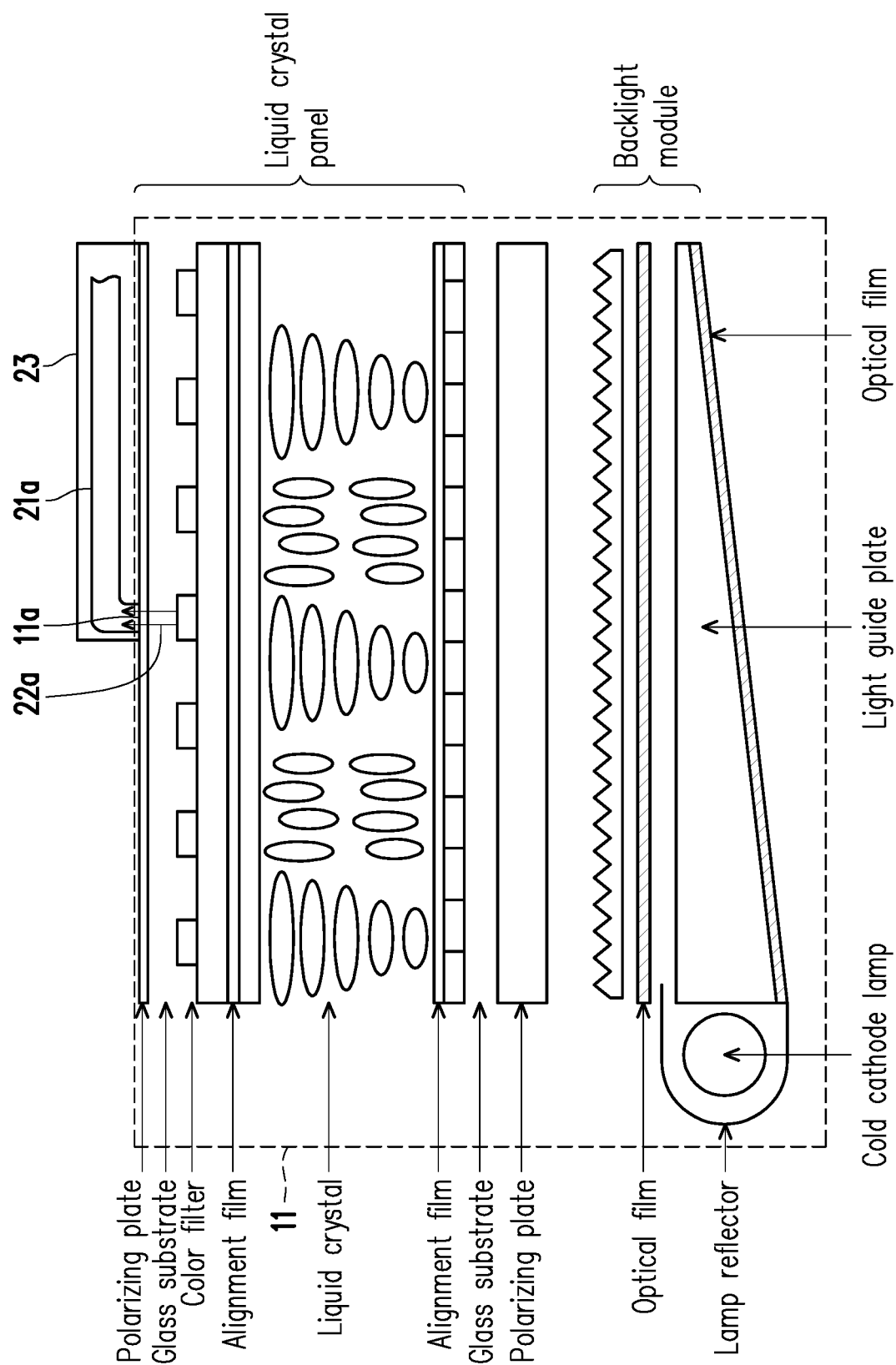
FIG. 3A is a schematic diagram of attaching an acrylic patch configured with light guide fibers on a display surface of a display according to FIG. 2B.

Referring to FIG. 3A, FIG. 3A is a schematic diagram of attaching the acrylic patch configured with the light guide fibers on the display surface of the display according to FIG. 2B. In the embodiment, the display 11 may include various elements in a dotted line frame of FIG. 3A, and the acrylic patch 23 may be substantially attached on a polarizing plate, such that the light guide fiber 21a may collect the light 22a emitted from the specific location 11a. Moreover, as shown in FIG. 3A, the specific location 11a does not correspond to a certain pixel, but corresponds to pixels of a certain block. In this case, the light 22a collected by the light guide fiber 21a may be emitted by all of the pixels in the block, though the disclosure is not limited thereto.

Figure 3B:
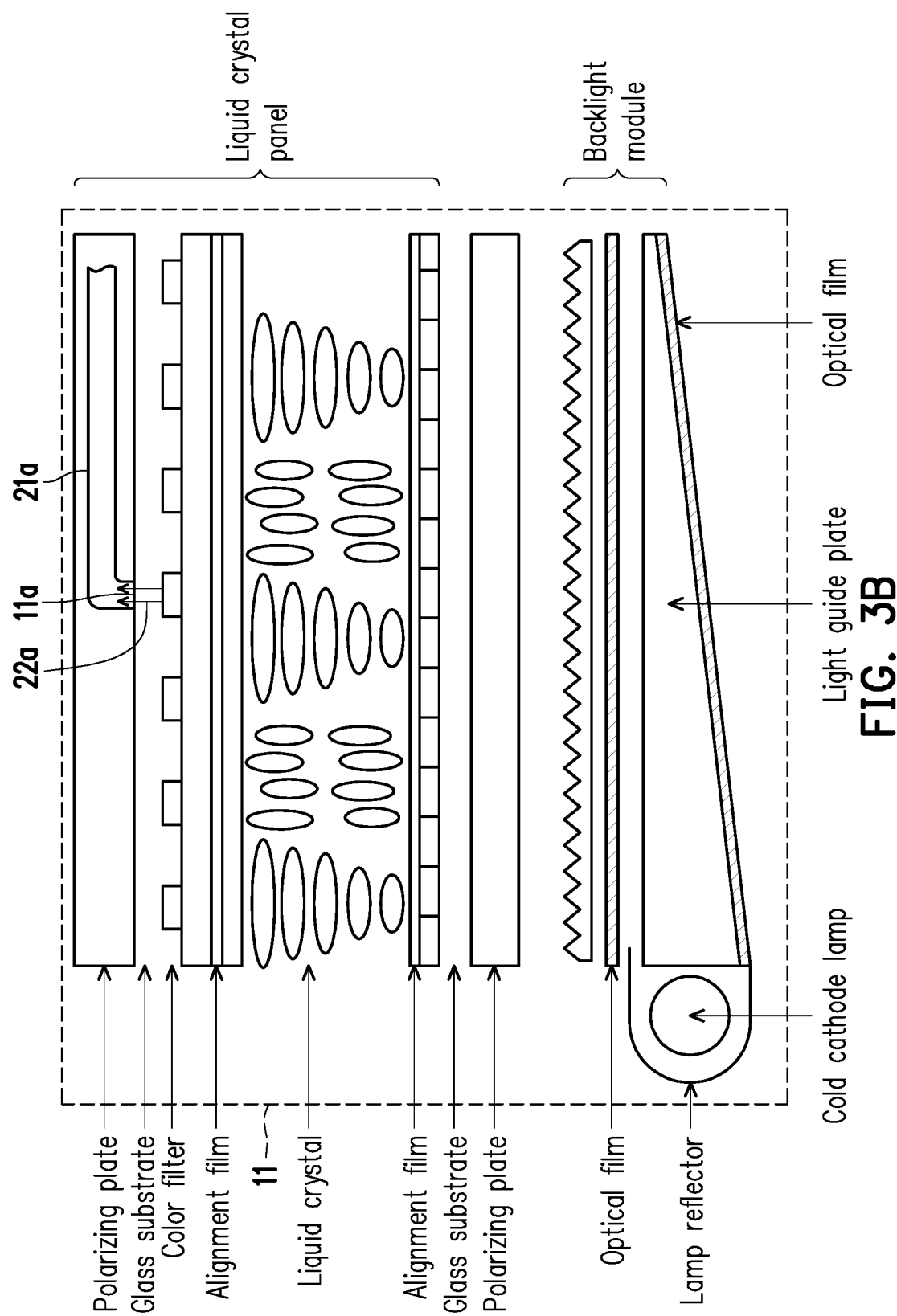
FIG. 3B is a schematic diagram of configuring the light guide fibers in the display according to an embodiment of the disclosure.

In other embodiments, the light guide fiber may be implemented by a part of the display 11. Referring to FIG. 3B, FIG. 3B is a schematic diagram of configuring the light guide fibers in the display according to an embodiment of the disclosure. In the embodiment, the display 11 may include various elements shown in FIG. 3B, and a difference between the embodiment of FIG. 3B and the embodiment of FIG. 3A is that the light guide fiber 21a of the embodiment of FIG. 3B is disposed in the polarizing plate of the display 11, and the light guide fiber 21a collects the light 22a emitted from the specific location 11a.

In general, in the aforementioned embodiments, when the light guide fibers are adopted to collect the lights emitted from the specific locations, one light guide fiber may only collect the light emitted from a single specific location. However, in other embodiments, when a light guide plate is adopted to serve as the light guide for collecting lights, the lights emitted from a plurality of specific locations may be collected by one light guide plate.

Figure 4:
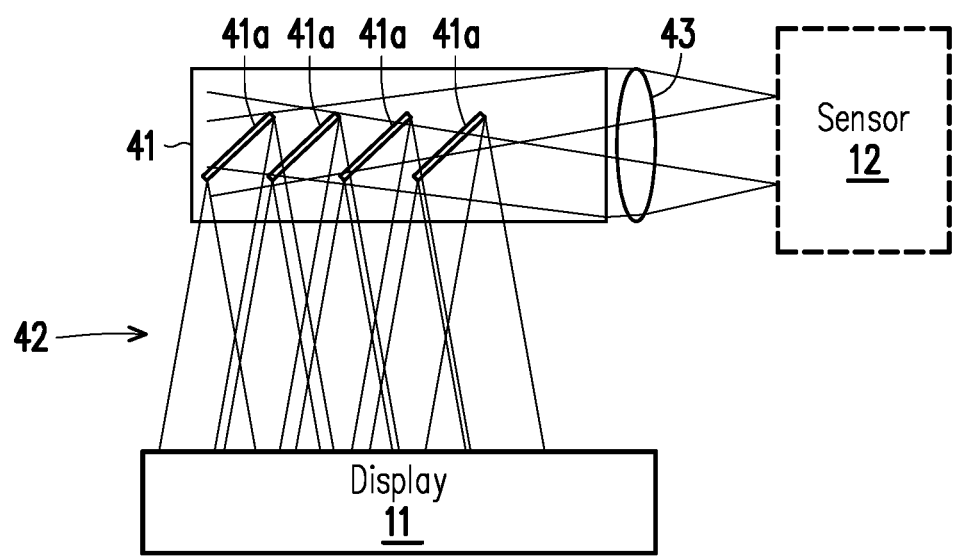
FIG. 4 is a schematic diagram of using a light guide plate to collect lights according to an embodiment of the disclosure.

Referring to FIG. 4, FIG. 4 is a schematic diagram of using a light guide plate to collect lights according to an embodiment of the disclosure. In the embodiment, after the lights 42 emitted from a plurality of specific locations on the display 11 enter the light guide plate 41, the lights 42 are reflected and/or refracted by reflectors 41a in the light guide plate 41, and the reflected and/or refracted lights 42 may be converged to the sensor 12 by a lens 43. In this way, the lights 42 emitted from a plurality of specific locations in one row, one column or one oblique line may be collected all at once. In other embodiments, a plurality of light guide plates 41 may be disposed on the display 11 according to an actual requirement of a designer, so as to collect lights of specific locations in different rows, columns or oblique lines, though the disclosure is not limited thereto.

Figure 5:
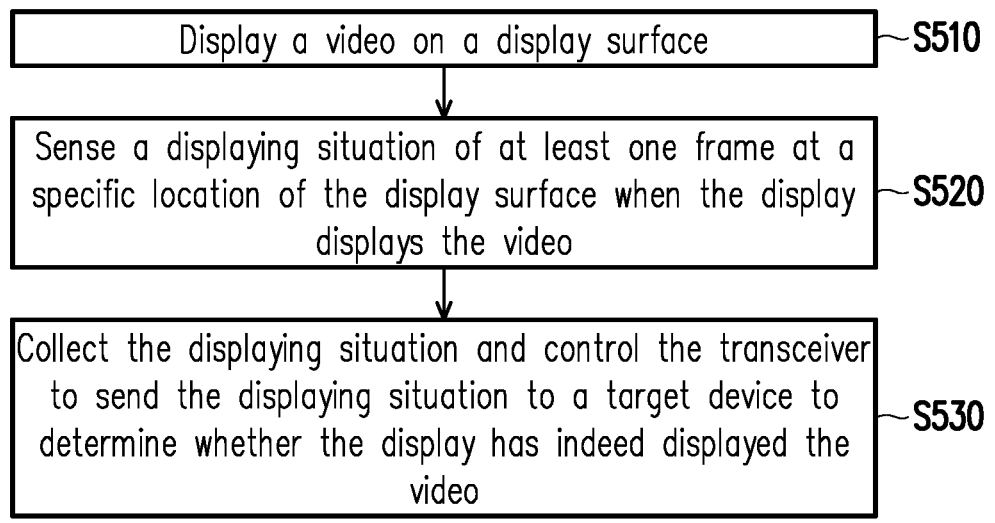
FIG. 5 is a flowchart illustrating a method according to an embodiment of the disclosure.

Referring to FIG. 5, FIG. 5 is a flowchart illustrating a method according to an embodiment of the disclosure. The method of the embodiment may be executed by the video playing device 100 of FIG. 1, and detailed steps of the method of FIG. 5 are described below with reference of FIG. 1. Moreover, in order to clearly describe the method, implementations shown in FIG. 2A to FIG. 2C are referred for description, though possible implementations of the disclosure are not limited thereto.

First, in step S510, the display 11 displays a video on the display surface 111. In different embodiments, the above video may be an advertising video or other kinds of video commissioned by an advertiser, though the disclosure is not limited thereto, and the above video may broadly include dynamic frames or static frames.

In step S520, when the display 11 displays the video, the processing unit 14 controls the sensor 12 to sense a displaying situation of at least one frame at a specific location of the display surface 111. Taking FIG. 2A to FIG. 2C as an example, the processing unit 14 may control the sensor 12 to collect the lights 22a and 22b emitted from the specific locations 11a and 11b through the light guide fibers 21a and 21b, and the lights 22a and 22b may characterize the displaying situations of the specific locations 11a and 11b.

Then, in step S530, the processing unit 14 collects the displaying situation and controls the transceiver 13 to send the displaying situation to a target device to determine whether the display 11 has indeed displayed the video. In the embodiment, the target device may be a server maintained by the advertiser, which may determine whether the video commissioned by the advertiser has been indeed played according to the displaying situation sent by the processing unit 14.

To be specific, in an embodiment, since the video is provided by the advertiser, the target device maintained by the advertiser may pre-store related information of the video, for example, what colors of the lights 22a and 22b will be presented on what specific locations of the display 11 at what time points. In other words, in view of the target device, when the video is displayed by the display 11, information such as the colors of the lights 22a and 22b displayed at the specific locations 11a and 11b at a certain time point is already known. Therefore, the target device may request the video playing device 100 to collect the displaying situations of the specific location 11a and/or the specific location 11b at a specific time point. Correspondingly, the processing unit 14 may control the sensor 12 to collect the displaying situations of the specific location 11a and/or the specific location 11b at the specific time point specified by the target device, and controls the transceiver 13 to send the collected displaying situations to the target device.

In this case, the target device may compare the displaying situation sent by the video playing device 100 with the aforementioned known video information. When the target device determines that the light collected from a certain specific location at a certain specific time point is not matched with the aforementioned known video information according to the aforementioned displaying situation, the target device may learn that the advertising video commissioned by the advertiser probably has not been played. For example, it is assumed that the displaying situation sent by the video playing device 100 indicates that the specific location 11a presents a white color at a $10^{th}$ second of the video, though the target device learns that the specific location 11a should present a black color at the $10^{th}$ second of the video based on the known video information, the target device may determine that the advertising video commissioned by the advertiser probably has not been played. In other words, the embodiment of the disclosure may provide a low cost and high reliability POP problem solution.

Moreover, in other embodiments, when the displaying situation is not matched with the known video information, it may also be due to failure of a display function in the specific location, so that the light guide cannot correctly obtain the light emitted from the specific location. Therefore, the target device may determine whether the display function of the display 11 is normal according to the displaying situation.

In other embodiments, the target device may further request the video playing device 100 to collect the displaying situations of different specific locations at different specific time points for sending back. For example, the target device may request the video playing device 100 to collect the light 22a of the specific location 11a at a first specific time point (for example, 10 ms) of the video, and meanwhile request the video playing device 100 to collect the light 22b of the specific location 11b at a second specific time point (for example, 20 ms) of the video. In this case, when the target device receives the aforementioned information collected by the video playing device 100, the target device may compare the lights 22a and 22b with the know video information to determine whether the video has been indeed played.

In an embodiment, the video playing device 100 may inquire the target device at which time points and specific locations should the displaying situation be collected before the video is played. Moreover, in other embodiments, since the above video may be scheduled to be played several times within a certain period of time (for example, 6 times, etc., in one day), after obtaining the several playing time of the video, the video playing device 100 may inquire the target device at which time points and specific locations should the displaying situation be collected in the several playing time all at once, though the disclosure is not limited thereto.

In an embodiment, the target device may edit the video, so as to display a specific content at positions in the video corresponding to the specific locations 11a and 11b, where the specific content may be irrelevant to a plot content of the video itself, which is described in detail below.

First, the target device may determine a coding content, and the coding content may include a plurality of binary codes. In different embodiments, the target device may determine the above coding content according to arbitrarily video representing information. For example, it is assumed that a code name of the video is "AD001", and a scheduled playing time thereof is "2017-12-16-14:00", the target device may combine the above two pieces of information into the video representing information of "AD001-2017-12-16-14:00", and transform the video representing information into a corresponding ASCII code (for example, 010000010100010 . . . ) to serve as the above coding content, though the disclosure is not limited thereto. In different embodiments, the designer may take any required information as the video representing information to generate the corresponding coding content.

After the coding content is determined, the target device may modify a frame of the video at a place corresponding to the specific location according to the coding content, which is described below in detail with reference of FIG. 6, FIG. 7A and FIG. 7B.

Figure 6:
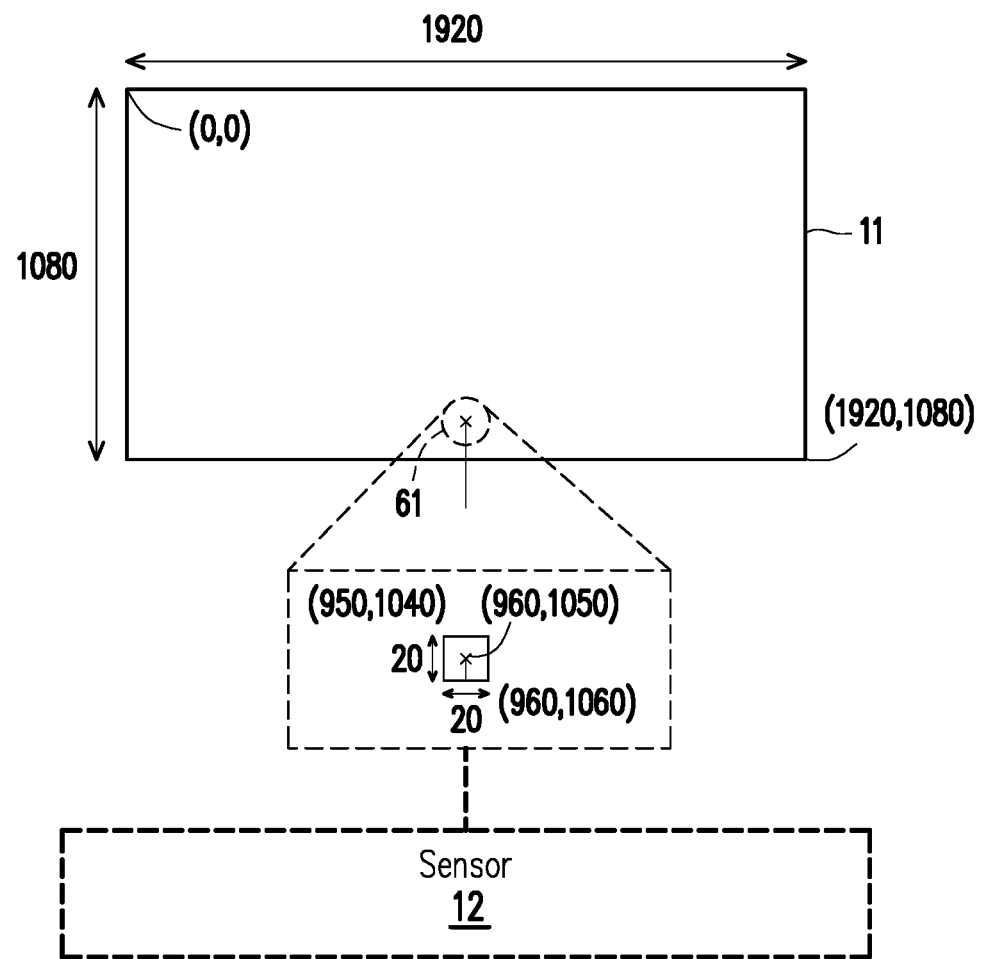
FIG. 6 is a schematic diagram of a display and a specific location according to an embodiment of the disclosure.
Figure 7A:
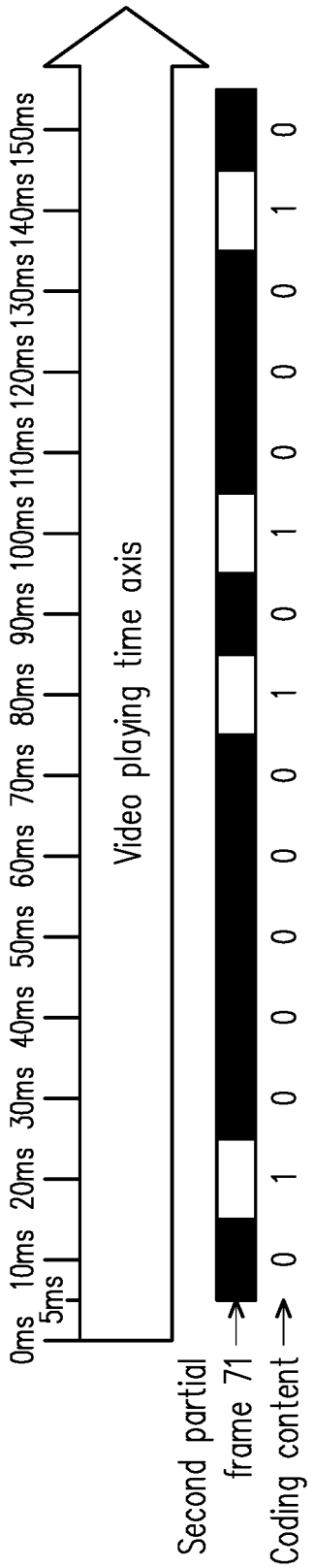
FIG. 7A is a schematic diagram of adjusting a frame of a video corresponding to a specific location according to a coding content.

Referring to FIG. 6 and FIG. 7A, FIG. 6 is a schematic diagram of a display and a specific location according to an embodiment of the disclosure, and FIG. 7A is a schematic diagram of adjusting a frame of the video corresponding to the specific location according to the coding content.

Referring to FIG. 6, the display 11 of the embodiment, for example, has a resolution of 1920×1080, and a upper left corner and a lower right corner of the display 11 are defined as coordinates (0,0) and (1920, 1080). Moreover, a specific location 61 of the embodiment is, for example, a block that takes coordinates (960, 1050) as a center point, and a range of the block is from coordinates (950, 1040) to coordinates (970, 1060).

In the embodiment, it is assumed that the coding content determined by the target device is the aforementioned "010000010100010 . . . ", the target device may, for example, encode "0" to the black color, and encode "1" to the white color. In this case, the target device may control the frame corresponding to the specific location 61 to present a variation of "black", "white", "black", "black", "black" . . . along with time.

It is assumed that the target device adjusts the frame corresponding to the specific location 61 in the video every 10 ms, the frame corresponding to the specific location 61 in the video may be varied according to a pattern shown in FIG. 7A. According to another aspect, after the target device edits the video according to the above teachings, each frame of the generated video includes a first partial frame and a second partial frame 71, where the first partial frame corresponds to the plot content of the video, and the second partial frame 71 corresponds to the coding content, and a position of the second partial frame 71 corresponds to the specific location 61 on the display 11.

Then, the target device may send the video edited according to the aforementioned teachings to the video playing device 100. In this case, when the edited video is displayed on the display 11, the second partial frame 71 displayed at the specific location 61 may independently presents a "black" and "white" variation according to the coding content, though the other part of the display 11 other than the specific location 61 may normally play the plot content of the video.

According to the teaching of the aforementioned embodiment, when the edited video is displayed by the display 11, the processing unit 14 may control the sensor 12 to collect the displaying situation of the specific location 61. In the embodiment, the processing unit 14 may control the sensor 12 to read the light emitted from the specific location 61 every 10 ms.

Moreover, in an embodiment, when the specific location 61 of the display 11 displays the second partial frame 71 corresponding one of the binary codes, the processing unit 14 may control the sensor 12 to delay by a predetermined time for sensing the displaying situation of the specific location 61 on the display 11. Taking FIG. 7A as an example, when the specific location 61 displays the second partial frame 71 presenting "black" at a 5 ms, the processing unit 14 may control the sensor 12 to delay by 5 ms for sensing the displaying situation of the specific location 61 on the display 11 (i.e. to perform sensing at a 10 ms). In this way, the sensor 12 may collect relatively stable light, and avoid collecting unstable light emitted when the specific location 61 just changes the displaying situation.

In an embodiment, when the sensor 12 is a photosensitive resistor, a sensing value thereof may be within a sensing interval between 0 and 255, and when the sensing value corresponding to the light collected by the sensor 12 from the specific location 61 is lower than a first threshold (for example, 90), the processing unit 14 may determine that the light is not bright, and define the light as logic "0" (i.e., "black"). On the other hand, when the sensing value corresponding to the light collected by the sensor 12 from the specific location 61 is higher than a second threshold (for example, 150), the processing unit 14 may determine that the light is bright, and define the light as logic "1" (i.e., "white").

In other words, under the above configuration, by simply using the photosensitive resistors with lower cost as the sensor 12, the processing unit 14 may substantially identify whether the light emitted from the specific location 61 at a certain specific time point corresponds to "0" or "1". Moreover, as described above, since the specific location 61 probably corresponds to a plurality of pixels in the display 11, and these pixels may not all perfectly perform the required black and white changes, the above mechanism may provide a certain degree of fault tolerance, and the embodiment of the disclosure may be implemented by lower cost.

Moreover, after the processing unit 14 completes collecting display content of a series of "010000010100010 . . . ", the processing unit 14 transmits the display content to the target device, and the target device may compare the above display content with the original coding content. When the display content is not matched to the original coding content, the target device may determine that the video probably has not been played, and generate a related message to notify an advertiser and/or an advertising broadcaster. In other words, the embodiment of the disclosure may provide a low cost and high reliability POP problem solution.

In an embodiment, the target device may design a length of the coding content to be equal to a length of the video. In other words, each of the frames in the video includes the first partial frame and the second partial frame, and the second partial frame keeps displaying content that is irrelevant to the video plot (for example, displaying the "black", "white" variations) from the beginning to the end of the video. In this way, the target device may detect whether the video has been completely played, so as to determine whether the video has been accidentally interrupted during a playing process (for example, interfered or covered by other signals). In the embodiment, if the length of the coding content is relatively short, the coding content may be repeatedly configured until the length of the overall coding content is enough to match the length of the video, though the disclosure is not limited thereto.

In another embodiment, the video may also be designed to have a first clip and a second clip, where each of the frames of the first clip may include the first partial frame corresponding to the plot content and the second partial frame corresponding to the coding content, and each of the frames of the second clip may all correspond to the plot content. In other words, the length of the coding content may be designed to be smaller than the length of the video, so as to reduce a related data amount.

In other embodiments, besides the method of encoding "0" to the black color and encoding "1" to the white color that is taught in the aforementioned embodiment, two bits of the coding content may be considered all at once, such that the second partial frame 71 displayed at the specific location 61 is more variable.

Figure 7B:
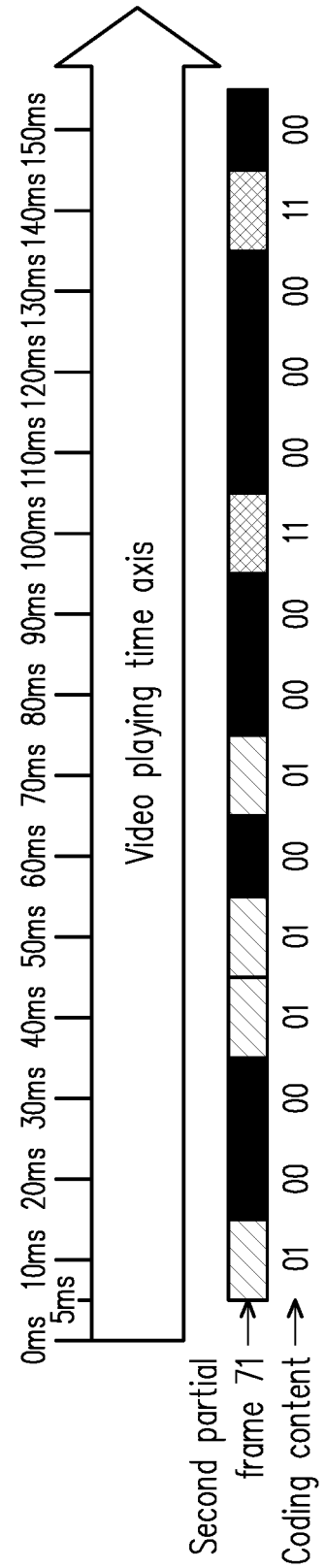
FIG. 7B is another schematic diagram of adjusting a frame of the video corresponding to the specific location according to the coding content.

Referring to FIG. 6 and FIG. 7B, FIG. 7B is another schematic diagram of adjusting a frame of the video corresponding to the specific location according to the coding content. As shown in FIG. 7B, "01" of the coding content may be encoded to a red color (represented by oblique lines); "00" may be encoded to the black color; "11" may be encoded to a blue color (represented by grids); and "10" may be encoded to a green color (not shown).

Correspondingly, the sensor 12 may be implemented by a color light sensor, so as to detect the color of the light emitted from the specific location 61. To be specific, sensing values of the sensor 12 are, for example, (R, G, B)=(0-255, 0-255, 0-255), and a sensing range thereof may be defined to correspond to four colors, i.e. the black color, the red color, the green color and the blue color. In this case, when the sensor 12 detects the black color, the sensor 12 defines the black color as "00"; when the sensor 12 detects the red color, the sensor 12 defines the red color as "01"; when the sensor 12 detects the blue color, the sensor 12 defines the blue color as "11"; and when the sensor 12 detects the green color, the sensor 12 defines the green color as "10".

In another embodiment, the aforementioned encoding method of considering two bits all at once may be used in collaboration with more complex specific location configuration patterns to provide more variability.

Figure 8:
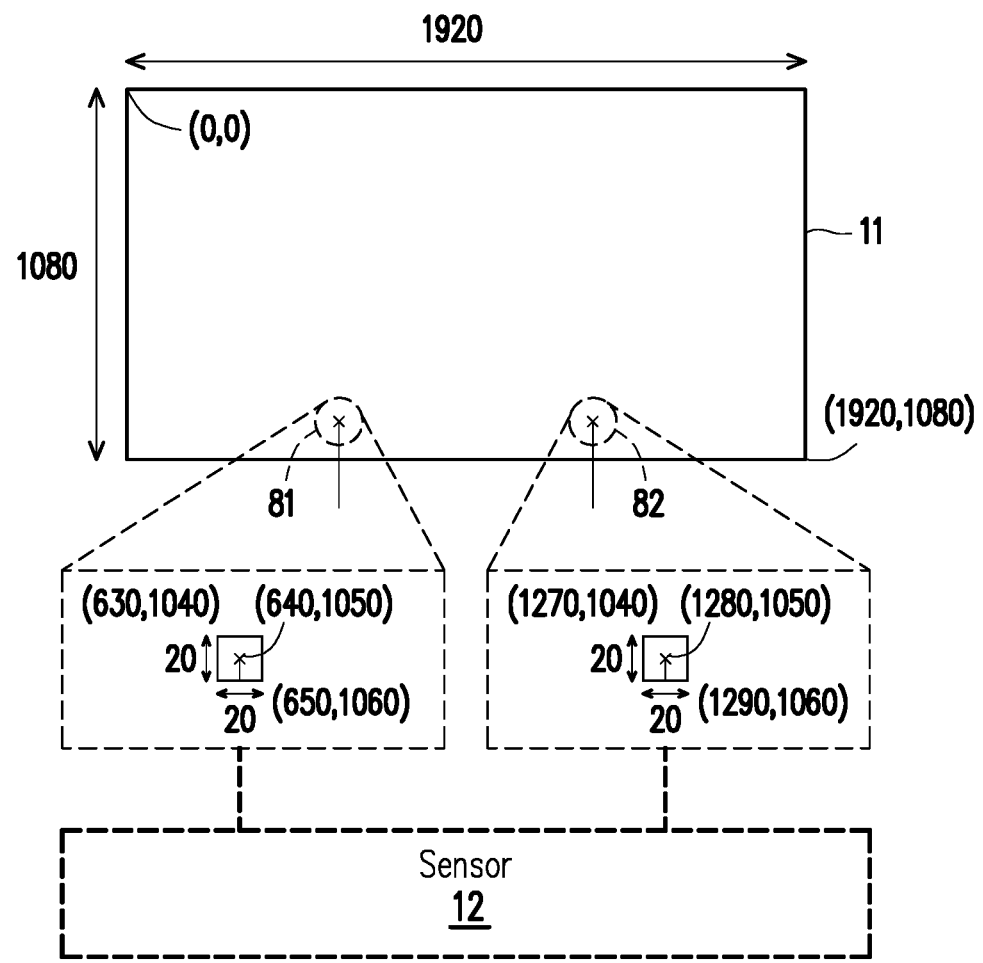
FIG. 8 is a schematic diagram of a display and specific locations according to an embodiment of the disclosure.

Referring to FIG. 8 and FIG. 9A, FIG. 8 is a schematic diagram of a display and specific locations according to an embodiment of the disclosure, and FIG. 9A is a schematic diagram of adjusting a frame of the video corresponding to the specific location according to the coding content.

Referring to FIG. 8, the display 11 of the embodiment, for example, has a resolution of 1920×1080, and a upper left corner and a lower right corner of the display 11 are defined as coordinates (0,0) and (1920, 1080). Moreover, two specific locations 81 and 82 are considered in the embodiment. The specific location 81 is, for example, a block that takes coordinates (640, 1050) as a center point, and a range of the block is from coordinates (630, 1040) to coordinates (650, 1060). Moreover, the specific location 82 is, for example, a block that takes coordinates (1280, 1050) as a center point, and a range of the block is from coordinates (1270, 1040) to coordinates (1290, 1060). Moreover, as described above, the lights emitted from the specific locations 81 and 82 may be individually transmitted to the sensor 12 through independent light guide fibers, and detail thereof is not repeated.

In FIG. 9A, second partial images 91 and 92 in the video may respectively correspond to the specific locations 81 and 82. Moreover, in the embodiment, when the considered two bits are "01", the second partial images 91 and 92 may be respectively encoded to "black" and "white"; when the considered two bits are "00", the second partial images 91 and 92 may be respectively encoded to "black" and "black"; when the considered two bits are "11", the second partial images 91 and 92 may be respectively encoded to "white" and "white"; and when the considered two bits are "10", the second partial images 91 and 92 may be respectively encoded to "white" and "black", though the disclosure is not limited thereto.

Different from FIG. 7B, in FIG. 9A, although two bits are also considered all at once, since the encoded second partial frames 91 and 92 still only has the "black" and "white" variation, a light sensor with lower cost may be adopted to implement the sensor 12.

Referring to FIG. 8 and FIG. 9B, and FIG. 9B is another schematic diagram of adjusting a frame of the video corresponding to the specific location according to the coding content. The pattern shown in FIG. 9B may be regarded as simultaneously implementing the coding method of FIG. 7B on the specific locations 81 and 82, so as to consider four bits in the coding content all at once, and a coding principle thereof is shown as a following table one.

TABLE 1

| Coding content | Second partial frame 91 | Second partial frame 92 |
|---|---|---|
| 0000 | Black | Black |
| 0001 | Black | Red |
| 0010 | Black | Green |
| 0011 | Black | Blue |
| 0100 | Red | Black |
| 0101 | RED | RED |
| 0110 | RED | Green |
| 0111 | RED | Blue |
| 1000 | Green | Black |
| 1001 | Green | Red |
| 1010 | Green | Green |
| 1011 | Green | Blue |
| 1100 | Blue | Black |
| 1101 | Blue | Red |
| 1110 | Blue | Green |
| 1111 | Blue | Blue |

Those with ordinary skills of the art may deduce a corresponding relationship between the coding content and the second partial frames 91 and 92 of the embodiment based on teachings of the aforementioned embodiments, and details thereof are not repeated.

In other embodiments, a related authentication mechanism may be adopted to further improve reliability of the above technical solution.

Figure 10A:
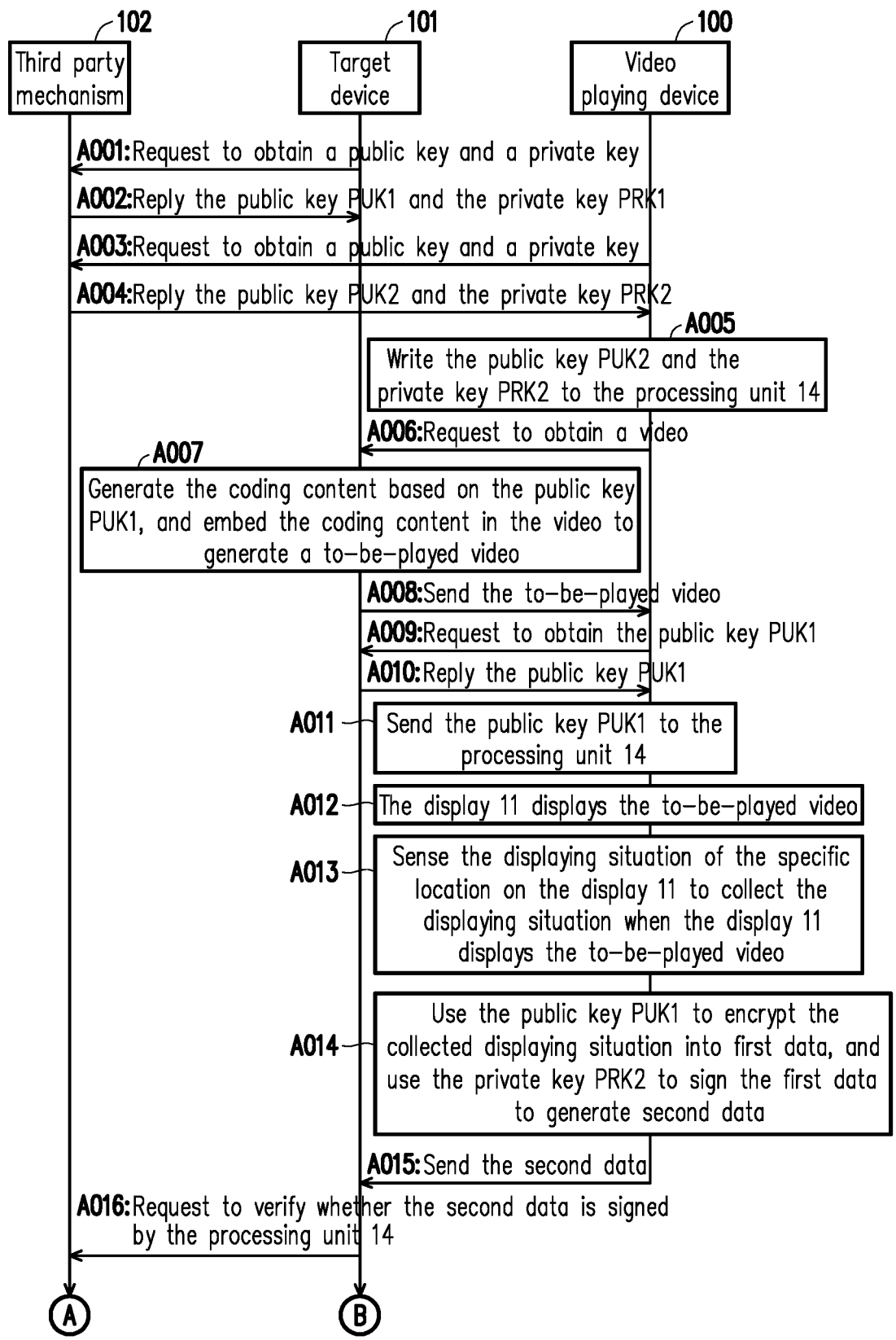
FIG. 10A and FIG. 10B are flowcharts illustrating a method for proof of play according to an embodiment of the disclosure.
Figure 10B:
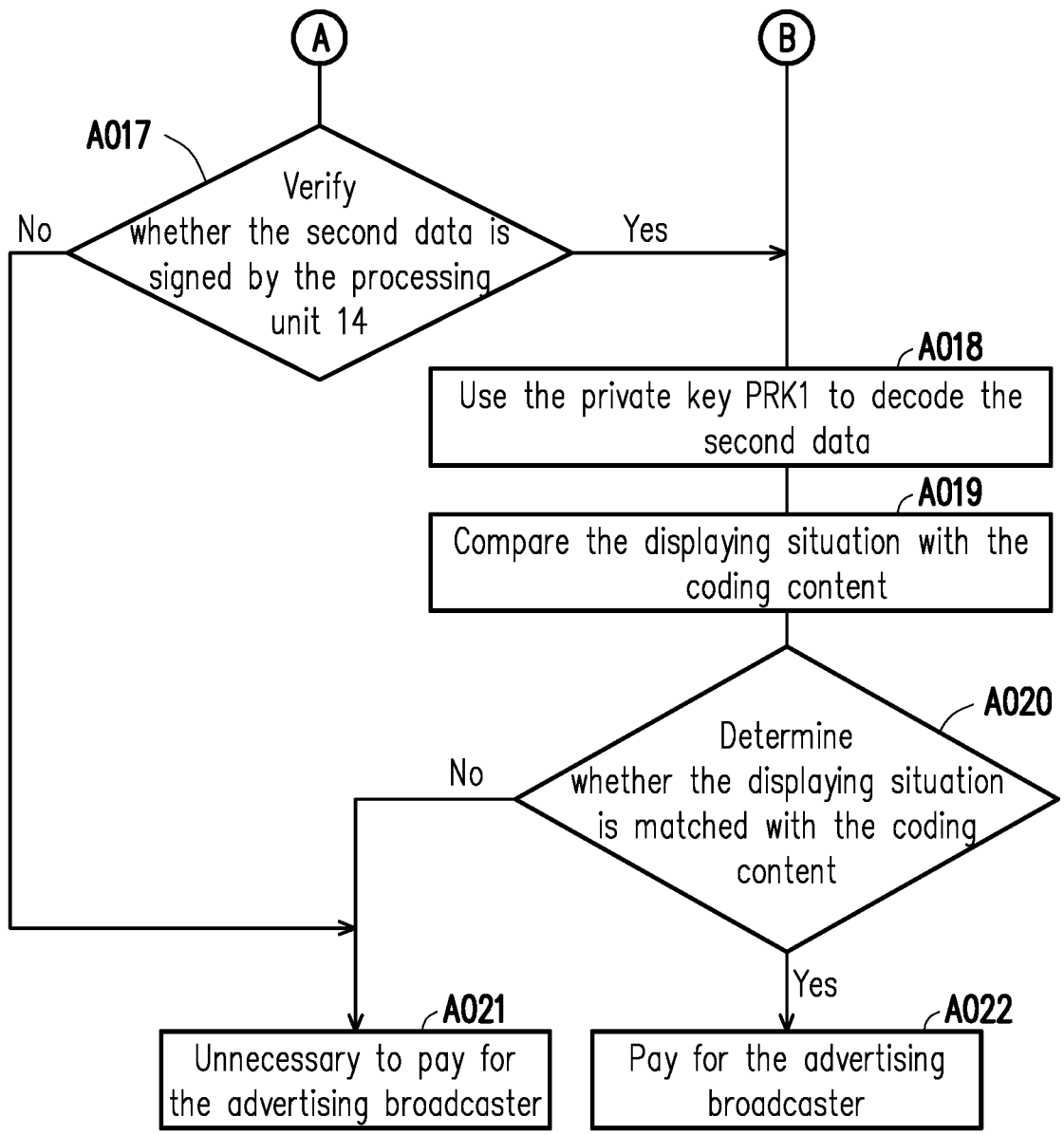

Referring to FIG. 10A and FIG. 10B, FIG. 10A and FIG. 10B are flowcharts illustrating a method for proof of play according to an embodiment of the disclosure. In FIG. 10A and FIG. 10B, a target device 101 is, for example, an advertising video server maintained by the advertiser, and the video playing device 100 is, for example, an advertising machine (for example, a digital signage) maintained by an advertising broadcaster, and a third party mechanism 102 is, for example, a device assisting mutual authentication of the target device 101 and the video playing device 100.

Schematically, the advertiser of the embodiment may commission the advertising broadcaster to play a specified video (for example, an advertising video), and before the above video is indeed played, the third party mechanism 102 may first provide keys required by the target device 101 and the video playing device 100 to facilitate a subsequent authentication operation. Moreover, when the video is played, the video playing device 100 may collect the displaying situation of the specific location and provide the same to the target device 101. Then, the target device 101 may determine whether the above video has been indeed played according to the displaying situation provided by the video playing device 100, and the advertiser may accordingly pay/not pay for the advertising broadcaster, which is described in detail below.

First, in step A001, the target device 101 requests to obtain a public key and a private key from the third party mechanism 102, and in step A002, the third party mechanism 102 replies the public key PUK1 and the private key PRK1 to the target device 101.

Similarly, in step A003, the video playing device 100 also requests to obtain a public key and a private key from the third party mechanism 102, and in step A004, the third party mechanism 102 replies the public key PUK2 and the private key PRK2 to the video playing device 100. Then, in step A005, the public key PUK2 and the private key PRK2 are written to the processing unit 14 of the video playing device 100.

In an embodiment, the processing unit 14 is, for example, a microcontroller unit (MCU) having a One Time Programmable (OTP) function. Alternatively, a program executed by the processing unit 14 and the public key PUK2 and the private key PRK2 may be stored in a Read-Only memory (ROM). Namely, the program of the processing unit 14 in the video playing device 100 cannot be modified. In this way, the video playing device 100 may get the trust of the advertiser. On the other hand, since the processing unit 14 stores the unique private key PRK2, and the private key PRK2 may be used for signing all data to be transmitted to the target device 101, it facilitates the target device 101 confirming reliability of the received data.

Referring to FIG. 10A, in step A006, the video playing device 100 requests to obtain a video (for example, an advertising video) from the target device 101.

In an embodiment, when the video playing device 100 requests to obtain the video from the target device 101, the video playing device 100 may simultaneously notify information of a specific location adapted to collect light by using the light guide to the target device 101. Taking FIG. 6 as an example, the video playing device 100 may notify a block corresponding to the specific location 61 (i.e. a block ranged from the coordinates (950, 1040) to the coordinates (970, 1060)) to the target device 101. Taking FIG. 8 as an example, the video playing device 100 may notify a block corresponding to the specific location 81 (i.e. a block ranged from the coordinates (630, 1040) to the coordinates (650, 1060)) and a block corresponding to the specific location 82 (i.e. a block ranged from the coordinates (1270, 1040) to the coordinates (1290, 1060)) to the target device 101.

After learning the block corresponding to the specific location on the video playing device 100, the target device 101 may learn where to present the second partial frame corresponding to the coding content in the video. Therefore, in step A007, the target device 101 generates the coding content based on the public key PUK1, and embeds the coding content in the video to generate the to-be-played video. In an embodiment, the target device 101 may use the public key PUK1 to encrypt information to be identified, and embed the coding content in the video based on the content instructed in the aforementioned embodiment. The aforementioned to-be-played video, for example, includes a first partial frame and a second partial frame, where the first partial frame corresponds to a plot content of the video, and the second partial frame corresponds to the coding content, and a location of the second partial frame corresponds to the specific location on the display 11. Related description of the second partial frame may refer to the content of the aforementioned embodiments, and detail thereof is not repeated.

In another embodiment, the video playing device 100 may also provide specifically designed software when requests to obtain the video from the target device 101, and the target device 101 may automatically generate the encrypted to-be-played video embedded with the coding content by only inputting the video, the coding content and the public key PUK1 to the software, though the disclosure is not limited thereto.

Then, in step A008, the target device 101 transmits the to-be-played video to the video playing device 100. Then, in step A009, the video playing device 100 requests to obtain the public key PUK1 from the target device 101, and in step A010, the target device 101 correspondingly replies the public key PUK1 to the video playing device 100.

In step A011, the public key PUK1 is transmitted to the processing unit 14. In step A012, the display 11 displays the to-be-played video. Then, in step A013, when the display 11 displays the video, the sensor 12 may sense the displaying situation of the specific location on the display 11 to collect the displaying situation. A detailed description of the step A013 may refer to related description in the aforementioned embodiment, which is not repeated.

Then, in step A014, the video playing device 100 uses the public key PUK1 to encrypt the collected displaying situation into first data, and uses the private key PRK2 to sign the first data to generate second data. In step A015, the video playing device 100 transmits the second data to the target device 101.

In step A016, the target device 101 requests the third party mechanism 102 to verify whether the second data is signed by the processing unit 14 (the video playing device 100). In step A017, the third party mechanism 102 verifies whether the second data is signed by the processing unit 14 (the video playing device 100). If yes, a step A018 is continually executed, and if not, a step A021 is executed.

In the step A018, the target device 101 uses the private key PRK1 to decrypt the second data. Moreover, in step A019, the target device 101 compares the displaying situation with the coding content, and in step A020, the target device 101 determines whether the displaying situation is matched with the coding content. If yes, it represents that the video has been indeed played by the video playing device 100, and a step A022 is continually executed, and if not, it represents that the video has not been played by the video playing device 100, and the step A021 is executed.

In the step A021, the advertiser is unnecessary to pay for the advertising broadcaster (since the video has not been indeed played), conversely, in step A022, the advertiser may pay for the advertising broadcaster (since the video has been indeed played).

In the embodiment of FIG. 10A and FIG. 10B, since each time before the video is played, the target device 101 is required to generate and transmit the to-be-played video to the video playing device 100, a large data transmission amount is required. Therefore, an embodiment shown in FIG. 11A and FIG. 11B is provided to reduce the data transmission amount.

Figure 11A:
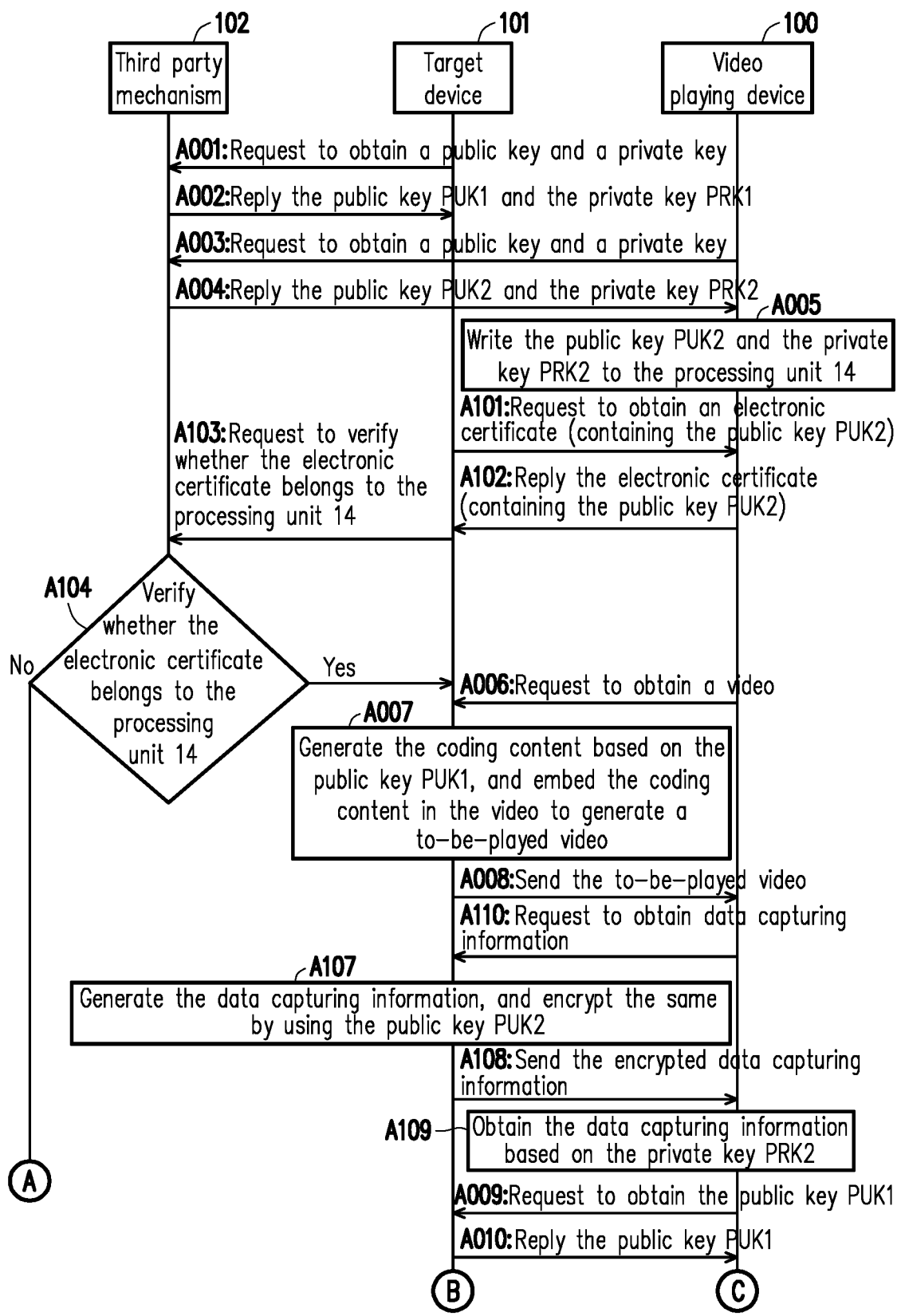
FIG. 11A and FIG. 11B are flowcharts illustrating the method for proof of play according to another embodiment of the disclosure.
Figure 11B:
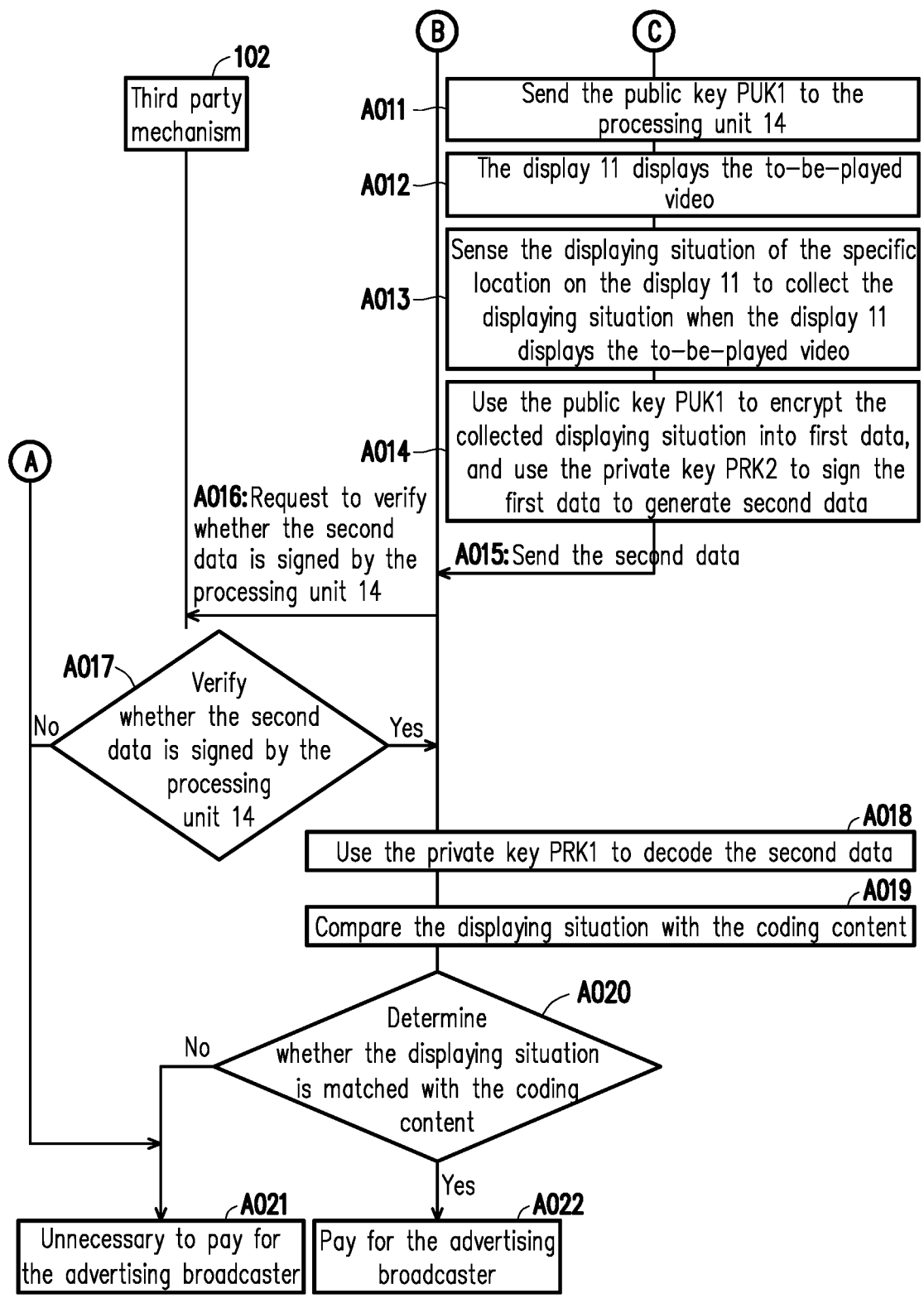

Referring to FIG. 11A and FIG. 11B, FIG. 11A and FIG. 11B are flowcharts illustrating the method for proof of play according to another embodiment of the disclosure. Schematically, a main difference between FIGS. 11A-11B and FIGS. 10A-10B is that the video playing device 100 of FIG. 11A and FIG. 11B may first obtain the to-be-played video from the target device 101, and inquires the target device 101 at which specific time point and specific location should the displaying situation (which is referred to as data capturing information hereinafter) be collected each time before playing the to-be-played video. In other words, the target device 101 is unnecessary to repeatedly produce new to-be-played videos and transmit the same to the video playing device 100, but is only required to adjust the content of the data capturing information and transmit the same to the video playing device 100. In this way, the data transmission amount is effectively reduced, which is described in detail below.

First, in step A001, the target device 101 requests to obtain a public key and a private key from the third party mechanism 102, and in step A002, the third party mechanism 102 replies the public key PUK1 and the private key PRK1 to the target device 101. Similarly, in step A003, the video playing device 100 also requests to obtain a public key and a private key from the third party mechanism 102, and in step A004, the third party mechanism 102 replies the public key PUK2 and the private key PRK2 to the video playing device 100. Then, in step A005, the public key PUK2 and the private key PRK2 are written in the processing unit 14 of the video playing device 100. Details of the steps A001 to A005 may refer related descriptions in the aforementioned embodiment, and details thereof are not repeated.

Then, in step A101, the target device 101 requests to obtain an electronic certificate (containing the public key PUK2) from the video playing device, and in step A102, the video playing device 100 replies the electronic certificate (containing the public key PUK2) to the target device 101. Then, in step A103, the target device 101 requests the third party mechanism 102 to verify whether the electronic certificate belongs to the processing unit 14 (the video playing device 100), and in step A104, the third party mechanism 102 verifies whether the electronic certificate belongs to the processing unit 14 (the video playing device 100). If yes, a step A006 is continually executed, and if not, a step A021 is executed.

In the step A006, the video playing device 100 requests to obtain a video (for example, an advertising video) from the target device 101. In step A007, the target device 101 generates a coding content based on the public key PUK1, and embeds the coding content in the video to generate a to-be-played video. In step A008, the target device 101 transmits the to-be-played video to the video playing device 100 and stores the same in the storage unit 16 for subsequent use. Details of the steps A006 to A008 may refer related descriptions in the aforementioned embodiment, and details thereof are not repeated.

In step A110, the video playing device 100 requests to obtain data capturing information from the target device 101. Namely, the video playing devices 100 inquires the target device 101 at which specific time point and specific location should the displaying situation be collected. Correspondingly, in step A107, the target device 101 generates the data capturing information, and encrypts the same by using the public key PUK2. In step A108, the target device 101 sends the encrypted data capturing information to the video playing device 100.

In an embodiment, the target device 101 may notify the video playing device 100 to collect the displaying situation of a first specific location at a first specific time point, and collect the displaying situation of a second specific location at a second specific time point.

As shown in FIG. 8, before the video playing device 100 plays the to-be-played video for the first time, if the target device 101 requires the video playing device 100 to collect the displaying situation of the specific location 81 at 10 ms, and collect the displaying situation of the specific location 82 at 20 ms, the target device 101 may generate the corresponding data capturing information to notify the video playing device 100. Moreover, before the video playing device 100 again plays the to-be-played video, if the target device 101 requires the video playing device 100 to collect the displaying situation of the specific location 82 at 30 ms, and collect the displaying situation of the specific location 81 at 40 ms, the target device 101 may also generate the corresponding data capturing information to notify the video playing device 100, though the disclosure is not limited thereto.

In other words, before the video playing device 100 plays the video, the target device 101 may request the video playing device 100 to adjust the method of collecting the displaying situation by adjusting the content of the data capturing information. In this way, the target device 101 is unnecessary to repeatedly transmit the re-edited video, and is only required to transmit different data capturing information to the video playing device 100. Since the target device 101 has the data capturing information itself, when the video playing device 100 subsequently transmits the collected displaying situation, the target device 101 may still find the coding content adapted to be compared with the displaying situation.

Moreover, in other embodiments, since the aforementioned video is probably scheduled to be played for several times within a certain time (for example, played for 6 times within one day, etc.), the video playing device 100 may inquire the target device 101 for the data capturing information individually corresponding to the several video playing time all at once after the several playing time of the scheduled video, so as to learn at which specific time point and specific location should the displaying situation be collected in each playing time of the video.

Referring to FIG. 11A, after the video playing device 100 receives the encrypted data capturing information, in step A109, the video playing device 100 decrypts the encrypted data capturing information based on the private key PRK2, so as to learn at which specific time point and specific location should the displaying situation be collected in each playing time of the video. Then, in step A009, the video playing device 100 requests to obtain the public key PUK1 from the target device 101, and in step A010, the target device 101 correspondingly replies the public key PUK1 to the video playing device 100. In step A011, the public key PUK1 is transmitted to the processing unit 14 (the video playing device 100). In step A012, the display 11 displays the to-be-played video. Details of the steps A009 to A012 may refer to related description of the aforementioned embodiment, which are not repeated.

Then, in step A013, when the display 11 displays the video, the processing unit 14 controls the sensor 12 to sense the displaying situation of the specific location on the display 11 to collect the displaying situation according to the data capturing information. Namely, the sensor 12 may individually collect the displaying situations of one or a plurality of specific locations at a plurality of specific time points according to the data capturing information.

For example, when the video playing device 100 plays the to-be-played video, if the current data capturing information indicates that the target device 101 requests the video playing device 100 to collect the displaying situation of the specific location 81 at 10 ms, and collect the displaying situation of the specific location 82 at 20 ms, the sensor 12 then respectively collects the displaying situations of the specific locations 81 and 82 at 10 ms and 20 ms. Similarly, when the video playing device 100 again plays the to-be-played video, if the current data capturing information indicates that the target device 101 requests the video playing device 100 to collect the displaying situation of the specific location 82 at 20 ms, and collect the displaying situation of the specific location 81 at 40 ms, the sensor 12 then respectively collects the displaying situations of the specific locations 81 and 82 at 30 ms and 40 ms, though the disclosure is not limited thereto.

Referring to FIG. 11A again, in step A014, the video playing device 100 uses the public key PUK1 to encrypt the collected displaying situation into first data, and uses the private key PRK2 to sign the first data to generate second data. In step A015, the video playing device 100 transmits the second data to the target device 101.

In step A016, the target device 101 requests the third party mechanism 102 to verify whether the second data is signed by the processing unit 14 (the video playing device 100). In step A017, the third party mechanism 102 verifies whether the second data is signed by the processing unit 14 (the video playing device 100). If yes, a step A018 is continually executed, and if not, a step A021 is executed. In the step A018, the target device 101 uses the private key PRK1 to decrypt the second data. Moreover, in step A019, the target device 101 compares the displaying situation with the coding content, and in step A020, the target device 101 determines whether the displaying situation is matched to the coding content. If yes, it represents that the video has been indeed played by the video playing device 100, and a step A022 is continually executed, and if not, it represents that the video has not been played by the video playing device 100, and the step A021 is executed. In the step A021, the advertiser is unnecessary to pay for the advertising broadcaster (since the video has not been indeed played), conversely, in step A022, the advertiser may pay for the advertising broadcaster (since the video has been indeed played).

According to the above description, it is known that the method shown in FIG. 11A and FIG. 11B may reduce the data transmission amount between the target device 101 and the video playing device 100, so as to improve an operation performance. It should be noted that although the related verification operation, and the encryption/decryption operation performed through the public key and the private key are mentioned in the embodiments of FIG. 1A to FIG. 11B, in other embodiments, the method shown in FIG. 10A to FIG. 11B may also be executed without encryption/decryption/verification.

In other embodiments, the sensor 12, the transceiver 13, the processing unit 14 and the storage unit 16 in the video playing device 100 may be independently implemented as one external module, and such module may be externally connected to a general display device to capture displaying situations of the display device.

Figure 12:
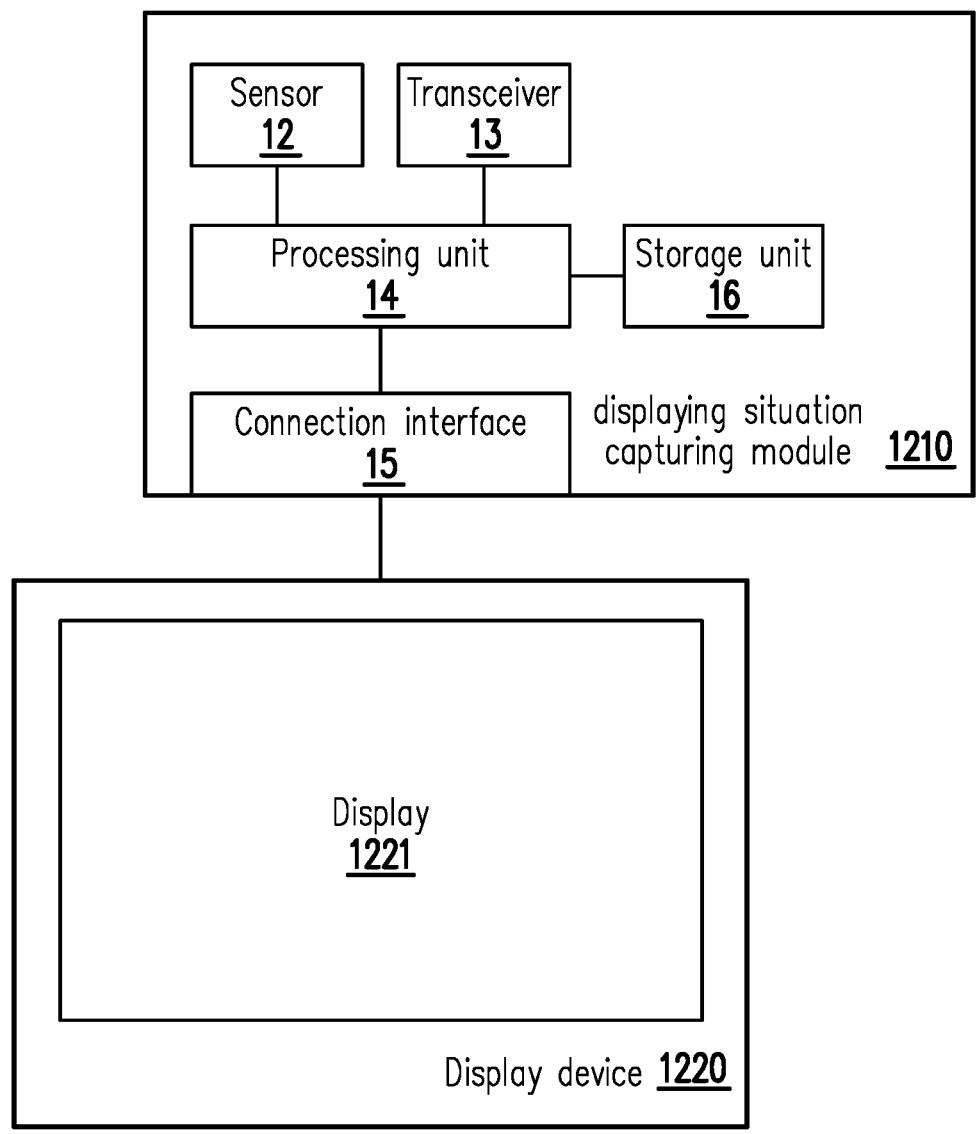
FIG. 12 is a schematic diagram of a displaying situation capturing module and a display device according to an embodiment of the disclosure.

To be specific, referring to FIG. 12, FIG. 12 is a schematic diagram of a displaying situation capturing module and a display device according to an embodiment of the disclosure. As shown in FIG. 12, the displaying situation capturing module 1210 includes a sensor 12, a transceiver 13, a processing unit 14, a storage unit 16 and a connection interface 15, where operation methods and details of the sensor 12, the transceiver 13, the processing unit 14 and the storage unit 16 may refer to related description of the aforementioned embodiment, and the connection interface 15 is, for example, a Universal Serial Bus (USB), a thunderbolt or other connection interface adapted to the display device 1220. The display device 1220 is, for example, a digital signage having a display 1221.

In the embodiment, the display 1221 may have one or a plurality of specific locations similar to that of the display 11 of FIG. 1, and the specific locations may all be configured with corresponding light guides (for example, light guide fibers or light guide plates) for collecting displaying situations of the specific locations (for example, lights emitted from the specific locations). Moreover, each of the aforementioned light guides may transmit the displaying situations to the sensor 12 of the displaying situation capturing module 1210 through the connection interface 15, such that the sensor 12, the transceiver 13, the processing unit 14 and the storage unit 16 may operate in collaboration to implement the displaying situation capturing method of the disclosure according to the teachings of the aforementioned embodiments. Related details may refer the teachings of the aforementioned embodiments, which are not repeated.

Moreover, in the aforementioned embodiments, the coding content is implemented by ASCII binary codes, and different colors are adopted to represent the binary codes and displayed on the second partial frame, however, in other embodiments, other coding content may also be adopted or other patterns (for example, barcodes) or graphic elements may be adopted to represent the coding content to display as the second partial frame.

In summary, the method for proof of play provided by the embodiment of the disclosure is adapted to collect the displaying situations of the specific locations on the display at the specific time points, and the displaying situations may be obtained by the target device for comparing with the known video information. If the target device determines that the displaying situation collected from a certain specific location at a certain specific time point is not matched with the known video information according to the aforementioned displaying situations, the target device may learn that the advertising video commissioned by the advertiser has probably not been played. Therefore, the embodiment of the disclosure may provide a low cost and high reliability POP problem solution. Moreover, in the embodiments of the disclosure, whether a display function of the display is normal may also be determined according to the displaying situation.

Moreover, the displaying situation capturing module of the disclosure may be connected to any suitable video playing device in an external connection manner, so as to collect the displaying situation at the specific location of the display of the video playing device.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A video playing device, comprising:
a display, displaying a video on a display surface, wherein the video displayed on the display surface has at least one frame;
a sensor, configured to sense a displaying situation of the at least one frame at a specific location of the display surface as the display displays the video;
a transceiver; and
a processing unit, connected to the sensor, the display and the transceiver, and configured to:
obtain a to-be-played video from a target device according to a request, wherein the request comprises the specific location of the display surface and used for requesting the target device to embed a coding content to a location of the video corresponding to the specific location to produce the to-be-played video;
control the display to display the to-be-played video as the video;
collect the displaying situation and control the transceiver to send the displaying situation to the target device to determine whether the display has indeed displayed the video.

2. The video playing device as claimed in claim 1, wherein the sensor further comprises a light guide connected to or close to the specific location of the display surface, and configured to transmit light emitted from the specific location of the display surface to characterize the displaying situation of the specific location.

3. The video playing device as claimed in claim 2, wherein the light guide is a light guide fiber or a light guide plate.

4. The video playing device as claimed in claim 1, wherein the processing unit controls the sensor to collect the displaying situation of the specific location at a specific time point specified by the target device.

5. The video playing device as claimed in claim 4, wherein the processing unit further controls the sensor to collect another displaying situation of another specific location on the display surface at another specific time point specified by the target device, and controls the transceiver to send the another displaying situation to the target device.

6. The video playing device as claimed in claim 1, wherein the video comes from the target device, and the coding content is determined by the target device.

7. The video playing device as claimed in claim 1, wherein the video further comprises a second clip, and each of the frames of the second clip corresponds to a plot content.

8. The video playing device as claimed in claim 1, wherein the coding content comprises a plurality of binary codes, and a second partial frame of each of the frames corresponds to at least one of the binary codes and different colors correspondingly represent each of the binary codes.

9. The video playing device as claimed in claim 8, wherein when the display displays the second partial frame corresponding to the at least one of the binary codes, the processing unit controls the sensor to delay by a predetermined time for sensing the displaying situation of the specific location on the display.

10. A displaying situation capturing method, adapted to a video playing device comprising a display, the displaying situation capturing method comprises:
displaying a video on a display surface by the display, wherein the video displayed on the display surface has at least one frame;
sensing a displaying situation of the at least one frame at a specific location of the display surface by a sensor as the display displays the video;
obtaining a to-be-played video from a target device according to a request, wherein the request comprises the specific location of the display surface and used for requesting the target device to embed a coding content to a location of the video corresponding to the specific location to produce the to-be-played video;
controlling the display to display the to-be-played video as the video;
collecting the displaying situation by a processing unit and sending the displaying situation to the target device by using a transceiver to determine whether the display has indeed displayed the video.

11. The displaying situation capturing method as claimed in claim 10, wherein the step of sensing the displaying situation of the at least one frame at the specific location of the display surface by the sensor comprises:

providing a light guide connected to or close to the specific location of the display surface, and transmitting light emitted from the specific location of the display by the light guide to characterize the displaying situation of the specific location.

12. The displaying situation capturing method as claimed in claim 10, wherein the step of sensing the displaying situation of the specific location on the display surface comprises:
using the processing unit to receive a specific time point specified by the target device, and collecting the displaying situation of the specific location at the specific time point.

13. The displaying situation capturing method as claimed in claim 12, further comprising:
using the processing unit to receive another specific time point specified by the target device, collecting another displaying situation of another specific location at the another specific time point, and sending the another displaying situation to the target device.

14. The displaying situation capturing method as claimed in claim 10, wherein the video is received from the target device, the coding content comprises a plurality of binary codes, and a second partial frame of each of the frames corresponds to at least one of the binary codes and different colors correspondingly represent each of the binary codes.

15. A displaying situation capturing module, comprising:
a connection interface, configured to connect a display;
a sensor, configured to sense a displaying situation of a frame at a specific location of a display surface when the display surface of the display displays a video;
a transceiver; and
a processing unit, connected to the sensor, the connection interface and the transceiver, and configured to:
obtain a to-be-played video from a target device according to a request, wherein the request comprises the specific location of the display surface and used for requesting the target device to embed a coding content to a location of the video corresponding to the specific location to produce the to-be-played video;
control the display to display the to-be-played video as the video;
collect the displaying situation and control the transceiver to send the displaying situation to the target device to determine whether the display has indeed displayed the video.

16. The displaying situation capturing module as claimed in claim 15, wherein the sensor further comprises a light guide connected to or close to the specific location, and configured to transmit light emitted from the specific location of the display surface to characterize the displaying situation of the specific location.

17. A method for proof of play, comprising:
obtaining video representing information;
converting the video representing information into a coding content;
embedding the coding content to a video to produce a to-be-played video, wherein the to-be-played video comprises a first partial frame and at least one second partial frame, the first partial frame corresponds to a plot content of the video, and the at least one second partial frame is obtained by converting the coding content;
sending the to-be-played video to a display of a video playing device to display;
receiving at least one displaying situation collected from a specific location on the display when the video playing device senses that the display displays the video, wherein the specific location corresponds to the at least one second partial frame; and
comparing the at least one displaying situation with the coding content to determine whether the video has been indeed played by the video playing device,
wherein the to-be-played video comprises a first clip, and each of the frames of the first clip comprises a first partial frame and a second partial frame, wherein the second partial frame is located at the specific location on the display surface, and the coding content is irrelevant to the plot content;
wherein the method further comprises:
receiving a request for obtaining the to-be-played video, wherein the request comprises the specific location on the display; and
embedding the coding content to a location of the video corresponding to the specific location.

18. The method for proof of play as claimed in claim 17, wherein in response to the comparison determining that the displaying situation is not matched with the coding content, it is determined that the video has not been played by the video playing device, and in response to the comparison determining that the displaying situation is matched with the coding content, it is determined that the video has been indeed played by the video playing device.

19. The method for proof of play as claimed in claim 17, wherein the video further comprises a second clip, and each of the frames of the second clip corresponds to the plot content.

20. The method for proof of play as claimed in claim 17, wherein the coding content comprises a plurality of binary codes, and the second partial frame of each of the frames corresponds to at least one of the binary codes and different colors correspondingly represent each of the binary codes.

21. A method for proof of play, comprising:
obtaining video representing information;
converting the video representing information into a coding content;
embedding the coding content to a video to produce a to-be-played video, wherein the to-be-played video comprises a first partial frame and at least one second partial frame, the first partial frame corresponds to a plot content of the video, and the at least one second partial frame is obtained by converting the coding content;
sending the to-be-played video to a display of a video playing device to display;
receiving at least one displaying situation collected from a specific location on the display when the video playing device senses that the display displays the video, wherein the specific location corresponds to the at least one second partial frame; and
comparing the at least one displaying situation with the coding content to determine whether the video has been indeed played by the video playing device,
wherein the to-be-played video comprises a first clip, and each of the frames of the first clip comprises a first partial frame and a second partial frame, wherein the second partial frame is located at the specific location on the display surface, and the coding content is irrelevant to the plot content;
wherein the method further comprises:
receiving a request for obtaining the to-be-played video, wherein the request comprises software; and inputting the video and the coding content to the software to generate the to-be-played video embedded with the coding content.

22. A method for proof of play, comprising:
obtaining video representing information;
converting the video representing information into a coding content;
embedding the coding content to a video to produce a to-be-played video, wherein the to-be-played video comprises a first partial frame and at least one second partial frame, the first partial frame corresponds to a plot content of the video, and the at least one second partial frame is obtained by converting the coding content;
sending the to-be-played video to a display of a video playing device to display;
receiving at least one displaying situation collected from a specific location on the display when the video playing device senses that the display displays the video, wherein the specific location corresponds to the at least one second partial frame; and
comparing the at least one displaying situation with the coding content to determine whether the video has been indeed played by the video playing device,
wherein the to-be-played video comprises a first clip, and each of the frames of the first clip comprises a first partial frame and a second partial frame, wherein the second partial frame is located at the specific location on the display surface, and the coding content is irrelevant to the plot content;
wherein the specific location comprises a first specific location, and after the step of sending the to-be-played video to the display of the video playing device to display, the method further comprises:
generating first data capturing information, wherein the first data capturing information is used for notifying the video playing device to collect a first displaying situation of the first specific location at a first specific time point when the video playing device plays the to-be-played video; and
sending the first data capturing information to the video playing device.

23. The method for proof of play as claimed in claim 22, wherein the specific location further comprises a second specific location, and the method further comprises:
generating a second data capturing information, wherein the second data capturing information is used for notifying the video playing device to collect a second displaying situation of the second specific location at a second specific time point when the video playing device again plays the to-be-played video; and
sending the second data capturing information to the video playing device together with the first data capturing information.

* * * * *